(12) United States Patent
Pillion et al.

(10) Patent No.: US 6,328,791 B1
(45) Date of Patent: Dec. 11, 2001

(54) AIR FILTRATION DEVICE

(75) Inventors: Lawrence M. Pillion, Glen Allen, VA (US); Anthony V. Cruz, Westlake Village, CA (US); Matt R. Ragland, Glen Allen, VA (US)

(73) Assignee: Hamilton Beach/Proctor-Silex, Inc., Glen Allen, VA (US)

(*) Notice: Subject to any disclaimer, the term of this patent is extended or adjusted under 35 U.S.C. 154(b) by 0 days.

(21) Appl. No.: 09/563,821

(22) Filed: May 3, 2000

(51) Int. Cl.$^7$ ............................ B01D 35/30; B01D 35/43
(52) U.S. Cl. ..................... 96/418; 96/424; 55/471; 55/495; 55/503
(58) Field of Search ............... 55/467, 471, 490, 55/495, 503, DIG. 34; 96/418, 424

(56) References Cited

U.S. PATENT DOCUMENTS

| | | |
|---|---|---|
| D. 189,420 | 12/1960 | Diehl . |
| D. 216,794 | 3/1970 | Patrick . |
| D. 234,606 | 3/1975 | Gamble . |
| D. 295,217 | 4/1988 | Glucksman . |
| D. 307,050 | 4/1990 | Glucksman et al. . |
| D. 325,253 | 4/1992 | Muderlak . |
| D. 328,637 | 8/1992 | Muller et al. . |
| D. 338,709 | 8/1993 | Lin et al. . |
| D. 345,010 | 3/1994 | Aronsson et al. . |
| D. 357,330 | 4/1995 | Wong et al. . |
| D. 360,028 | 7/1995 | Matsuda . |
| D. 374,713 | 10/1996 | Ford et al. . |
| D. 377,213 | 1/1997 | Wang . |
| D. 379,220 | 5/1997 | Ellwood . |
| D. 388,510 | 12/1997 | Rick et al. . |
| D. 390,940 | 2/1998 | Chen . |
| D. 394,100 | 5/1998 | Promseeda . |
| D. 395,146 | 6/1998 | Miller et al. . |
| D. 396,275 | 7/1998 | Pearson . |
| D. 399,943 | 10/1998 | Ko . |
| D. 400,661 | 11/1998 | Ko . |
| D. 400,662 | 11/1998 | Davis . |
| D. 402,022 | 12/1998 | Termeer et al. . |
| D. 409,741 | 5/1999 | Yuen-Ming . |
| D. 411,001 | 6/1999 | Pinchuk . |
| D. 416,318 | 11/1999 | Sato . |
| D. 416,319 | 11/1999 | Rollins . |
| D. 416,613 | 11/1999 | Bellil et al. . |
| D. 426,293 | 6/2000 | Tounsi et al. . |
| D. 428,862 | 8/2000 | Queffelec et al. . |
| D. 432,222 | 10/2000 | Rymer et al. . |
| D. 433,493 | 11/2000 | Runyan et al. . |
| D. 434,483 | 11/2000 | Pinchuk . |
| D. 462,293 | 6/2000 | Tounsi et al. . |
| 2,335,056 | 11/1943 | Grison et al. . |
| 2,611,068 | 9/1952 | Wellens . |
| 2,638,644 | 5/1953 | Rauhut . |

(List continued on next page.)

FOREIGN PATENT DOCUMENTS

WO 97/47928 A2   12/1997  (WO) .

OTHER PUBLICATIONS

National Geographic catalog; (approximately Jan. 2001).

*Primary Examiner*—Robert A. Hopkins
(74) *Attorney, Agent, or Firm*—Akin, Gump, Strauss, Hauer & Feld, L.L.P.

(57) ABSTRACT

An air filtration device for intake of atmospheric air, removal of contaminants from the atmospheric air, expulsion of filtered air, includes a housing configured for application directly to an electrical outlet and provides air intake from the front surface of the housing and air expulsion from the side of the housing to utilize a wall surface to disperse the filtered air. An indicator is provided to communicate that a filter should be changed, and a filter orientation system is provided to allow proper orientation of the filter with respect to air flow.

36 Claims, 10 Drawing Sheets

U.S. PATENT DOCUMENTS

| | | |
|---|---|---|
| 3,458,794 | 7/1969 | Bohnstedt et al. . |
| 3,474,376 | 10/1969 | Preiss . |
| 3,745,750 | 7/1973 | Arff . |
| 3,757,495 | 9/1973 | Sievers . |
| 3,860,404 * | 1/1975 | Jochimski ............................ 55/385.1 |
| 3,936,284 | 2/1976 | Mason . |
| 3,948,445 | 4/1976 | Andeweg . |
| 4,004,361 | 1/1977 | McVeety . |
| 4,040,568 | 8/1977 | Mason, Jr. et al. . |
| 4,118,191 | 10/1978 | Böhnensieker . |
| 4,121,529 | 10/1978 | Smith et al. . |
| 4,210,429 | 7/1980 | Golstein . |
| 4,214,146 | 7/1980 | Schimanski . |
| 4,467,263 | 8/1984 | Conforti et al. . |
| 4,647,832 | 3/1987 | Fenne et al. . |
| 4,666,638 | 5/1987 | Baker et al. . |
| 4,701,195 | 10/1987 | Rosendall . |
| 4,719,662 | 1/1988 | Horak et al. . |
| 4,731,520 | 3/1988 | Glucksman et al. . |
| 4,737,173 | 4/1988 | Kudirka et al. . |
| 4,743,406 | 5/1988 | Steiner et al. . |
| 4,743,829 | 5/1988 | Fenne et al. . |
| 4,795,883 | 1/1989 | Glucksman et al. . |
| 4,804,821 | 2/1989 | Glucksman . |
| 4,839,014 | 6/1989 | Park et al. . |
| 4,849,862 | 7/1989 | Diskin et al. . |
| 4,873,422 * | 10/1989 | Streich et al. ....................... 219/370 |
| 4,917,862 | 4/1990 | Kraw et al. . |
| 4,931,224 | 6/1990 | Holzner, Sr. . |
| 4,973,827 | 11/1990 | Nozaki . |
| 4,997,381 | 3/1991 | Oh . |
| 5,006,779 | 4/1991 | Fenne et al. . |
| 5,014,338 | 5/1991 | Glucksman . |
| 5,038,394 | 8/1991 | Hasegawa et al. . |
| 5,111,477 | 5/1992 | Muderlak . |
| 5,111,529 | 5/1992 | Glucksman . |
| 5,133,788 * | 7/1992 | Backus .................................. 55/467 |
| 5,139,546 | 8/1992 | Novobilski . |
| 5,160,879 | 11/1992 | Tortola et al. . |
| 5,210,818 | 5/1993 | Wang . |
| 5,220,152 | 6/1993 | Doran . |
| 5,230,723 | 7/1993 | Travis et al. . |
| 5,240,478 | 8/1993 | Messina . |
| 5,250,232 | 10/1993 | Pepper et al. . |
| 5,266,004 | 11/1993 | Tsumurai et al. . |
| 5,330,722 | 7/1994 | Pick et al. . |
| 5,378,254 | 1/1995 | Maly et al. . |
| 5,401,178 | 3/1995 | Liu . |
| 5,407,469 | 4/1995 | Sun . |
| 5,494,449 | 2/1996 | Chioo . |
| 5,547,615 | 8/1996 | Jané et al. . |
| 5,601,636 | 2/1997 | Glucksman . |
| 5,611,967 | 3/1997 | Jane et al. . |
| 5,613,863 | 3/1997 | Klaus et al. . |
| 5,616,172 | 4/1997 | Tuckerman et al. . |
| 5,628,641 | 5/1997 | Hahn . |
| 5,634,806 | 6/1997 | Hahn . |
| 5,713,749 | 2/1998 | Wu . |
| 5,735,918 | 4/1998 | Barradas . |
| 5,762,667 | 6/1998 | Pippel et al. . |
| 5,769,912 | 6/1998 | Mansur . |
| 5,772,732 | 6/1998 | James et al. . |
| 5,783,117 | 7/1998 | Byassee et al. . |
| 5,791,921 | 8/1998 | Lee . |
| 5,792,230 | 8/1998 | Moore et al. . |
| 5,800,583 | 9/1998 | Pippel et al. . |
| 5,800,741 | 9/1998 | Glenn et al. . |
| 5,803,940 | 9/1998 | Rick et al. . |
| 5,811,004 | 9/1998 | Robertson . |
| 5,829,993 | 11/1998 | Wu . |
| 5,837,207 | 11/1998 | Summers . |
| 5,840,092 | 11/1998 | Rick et al. . |
| 5,879,435 | 3/1999 | Satyapal et al. . |
| 5,891,399 | 4/1999 | Owesen . |
| 5,906,509 | 5/1999 | Wu . |
| 5,925,172 | 7/1999 | Rick et al. . |
| 5,925,320 | 7/1999 | Jones . |
| 5,945,038 | 8/1999 | Anderson . |
| 5,948,355 | 9/1999 | Fujishima et al. . |
| 5,967,807 | 10/1999 | Wu . |
| 5,997,619 | 12/1999 | Knuth et al. . |
| 6,017,375 | 1/2000 | Duell et al. . |
| 6,036,757 | 3/2000 | Gatchell et al. . |
| 6,042,400 | 3/2000 | Queffelec et al. . |
| 6,053,968 | 4/2000 | Miller . |
| 6,059,584 | 5/2000 | Mareno . |
| 6,062,880 | 5/2000 | Skuza . |
| 6,062,884 | 5/2000 | Messimer et al. . |
| 6,089,886 | 7/2000 | Mareno . |
| 6,126,460 | 10/2000 | Wu . |
| 6,179,633 | 1/2001 | Inada . |
| 6,190,184 | 2/2001 | Cimbal et al. . |

* cited by examiner

AIR FILTRATION DEVICE

BACKGROUND OF THE INVENTION

The present invention relates broadly to air filtration apparatus and, more particularly, to an air filtration device that is configured for abutment against an electrical outlet providing operational power for the device, with atmospheric air flowing into an intake on the front surface of the device, and filtered air being emitted through vents provided on the side of the device.

As the atmosphere in general becomes more polluted and the general population becomes more aware of discomforts associated with dirty air, air filtration devices of all shapes, types and sizes have become more popular. One type of air filtration device provides a small fan for use in a smoky environment. These devices typically will include an electric fan contained in a small housing for tabletop use, with a filter through which the air is directed for removal of smoke and other such contaminants. These small fans are useful for removing odors and contaminants from a confined space, since they typically take up little space themselves and move a relatively small volume of air.

Such current designs, while effective, leave room for improvement in the areas of noise control, air dispersion and filter management.

SUMMARY OF THE INVENTION

An air filtration device is provided for intake of atmospheric air, assistance in removal of contaminants from the atmospheric air, expulsion of filtered air and configured for operational association with a generally vertically oriented surface. The device includes a housing defining an air flow path therethrough having a front surface, at least one side surface and a rear surface; at least one air inlet formed in the front surface of the housing; and at least one air outlet formed in the housing intermediate the front surface and the rear surface, for cooperation of the air outlet with a generally vertical surface to which the air filtration device is associated for enhanced dispersion of filtered air expelled through the air outlet. A filter is mounted to the housing in the air flow path and an impeller is provided for moving air through the housing along the air flow path from the at least one air inlet to the at least one air outlet, with the impeller being mounted to the housing.

The air outlet may be formed on the at least one side surface and the air flow path may be defined from the air inlet on the front surface through the filter, through the impeller and outwardly through the air outlet. Also, the side surface may be curved and the air outlet may be formed as a series of vents along the curvature of the side surface.

The air filtration device may further include a bumper member attached to the rear surface of the housing for abutment with a generally vertical surface to which the air filtration device is associated for orientation of the device with the vertical surface. The bumper member may also be formed from resilient material for enhanced noise reduction when the air filtration device is in operation. The filter can be formed as a generally planar member selectively removable from the housing and can include a notch formed therein for directing insertion of the filter in a correct orientation with respect to the air flow path. The housing may include a locating surface formed thereon and corresponding with the notch in the filter to orient the filter in the housing. The housing may also include an icon formed thereon at a position corresponding with the notch in the filter when the filter is inserted in the housing for enhanced visual indication of proper filter orientation.

The air filtration device can include an electric motor for driving the impeller and a pair of electric prongs extending outwardly from the rear surface of the housing for operational engagement with an electrical wall outlet for supplying electric power to the electric motor. The pair of electrical prongs can be configured with each prong in the pair having substantially the same dimensions, so that said air filtration device may be connected to an electrical outlet without regard to the dimensional differences between the socket openings.

The air filtration device may further include an indicator for communicating that the filter should be changed, the indicator providing information after a predetermined period of operation of the air filtration device has passed. The impeller may be driven electrically and the indicator can include an electric timer circuit operationally associated with the impeller for determining when a predetermined time of impeller operation has passed.

A lamp may be mounted to the housing for illumination when the impeller is in operation, with the lamp being in electrical communication with the electric timer circuit and configured to provide pulsating illumination when a predetermined time of impeller operation has passed. A reset switch can be provided in electrical communication with the electric timer circuit to selectively reset the electric timer circuit to a zero operational time setting.

It will be understood by those skilled in the art that variations on that which is described above may be achieved by addition or omission of the features of the features above described.

Accordingly, an air filtration device is provided for intake of atmospheric air, assistance in removal of contaminants from the atmospheric air, expulsion of filtered air and configured for operational association with a generally vertically oriented surface, and includes a housing for abutting attachment to an electrical outlet, the housing defining an air flow path therethrough and having a front surface, at least one side surface and a rear surface; at least one air inlet formed in the housing; at least one air outlet formed in the housing intermediate the front surface and the rear surface; a filter mounted to the housing in the air flow path; an electrically driven impeller for moving air through the housing along the air flow path from the at least one air inlet to the at least one air outlet, with the impeller being mounted to the housing; and a pair of electric prongs extending outwardly from the rear surface for operational engagement with an electrical wall outlet for supplying electric power to the impeller. The pair of electrical prongs can be configured with each prong in the pair having substantially the same dimensions, so that said air filtration device may be connected to an electrical outlet without regard to the dimensional differences between the socket openings. A bumper member is attached to the rear surface of the housing for abutment with a generally vertical surface to which the bumper member may abut for orienting the device with the vertical surface. The bumper may be formed from resilient material for damping vibrations received from the housing to provide enhanced noise reduction when the air filtration device is in operation.

The air filtration device includes an air inlet that is formed on the front surface of the housing and the air flow path is defined from the air inlet on the front surface through the filter, through the impeller and outwardly through the air outlet. The filter may be formed as a generally planar member selectively removable from the housing and includes a notch formed therein for directing insertion of the filter in a correct orientation with respect to the air flow path. The housing may include a locating surface formed thereon and corresponding with the notch in the filter to orient the filter in the housing. The housing may include an icon formed at a position corresponding with the notch in the filter when the filter is inserted in the housing for enhanced visual indication of proper filter orientation.

The air filtration device may include an indicator for communicating that the filter should be changed, the indicator providing information after a predetermined period of operation of the air filtration device has passed. The impeller may be driven electrically and the indicator may include an electric timer circuit operationally engaged with the impeller for determining when a predetermined time of impeller operation has passed. The air filtration device also can include a lamp mounted to the housing for illumination when the impeller is in operation, the lamp being in electrical communication with the electric timer circuit and configured to provide pulsating illumination when a predetermined time of impeller operation has passed. A reset switch can be provided in electrical communication with the electric timer circuit to selectively reset the electric timer circuit to a zero operational time setting.

It should also be understood that the above-described features may be combined under a single, full-featured unit. In that regard, an air filtration device for intake of atmospheric air, removal of contaminants from the atmospheric air, expulsion of filtered air and configured for operational association with a generally vertically oriented surface, includes a housing for abutting attachment to an electrical outlet, the housing defining an air flow path therethrough and having a front surface, a curved side surface and a rear surface; at least one air inlet formed in the front surface of the housing; and a series of vents formed in the side surface intermediate the front surface and the rear surface, for cooperation of the vents with a generally vertical surface to which the air filtration device is associated for enhanced dispersion of filtered air expelled through the vents. A filter is mounted to the housing intermediate the at least one air inlet and the at least one air outlet, with the filter being formed as a generally planar member selectively removable from the housing and including a notch formed therein for directing insertion of the filter in a correct orientation with respect to the air flow path. The housing may include a locating surface formed thereon and corresponding with the notch in the filter to orient the filter in the housing. An electrically driven impeller is provided for moving air through the housing along the air flow path from the at least one air inlet to the vents, with the impeller being mounted to the housing. A pair of electric prongs extends outwardly from the rear surface for operational engagement with an electrical wall outlet for supplying electric power to the impeller. The pair of electrical prongs can be configured with each prong in the pair having substantially the same dimensions, so that the air filtration device may be connected to an electrical outlet without regard to the dimensional differences between the socket openings. A bumper member is attached to the rear surface of the housing for abutment with a generally vertical surface to which the bumper member may abut for orienting the device with the vertical surface. The bumper member may be formed from resilient material for damping vibrations received from the housing for enhanced noise reduction when the air filtration device is in operation.

The air filtration device may include an indicator providing information after a predetermined time period of operation of the air filtration device has passed. The indicator may include an electric timer circuit, as described above, to determine how long the impeller has been in operation and, when the time period has passed, an indicator lamp provides a pulsing illumination. The electric timer circuit may also be provided with a reset switch to selectively reset the electric timer circuit to a zero operational time setting.

By the above, the present invention provides an air filtration device that will plug directly into an outlet and utilize the wall behind the device for dispersion of filtered air, while directing air intake from a central source. The present invention also provides a handy visual indication of when the filter is placed in proper orientation with respect to air flow. Further, the device provides reduced noise by damping vibrations transmitted from the housing to the wall against which the device is mounted.

DESCRIPTION OF THE PREFERRED EMBODIMENT

Figure 1:
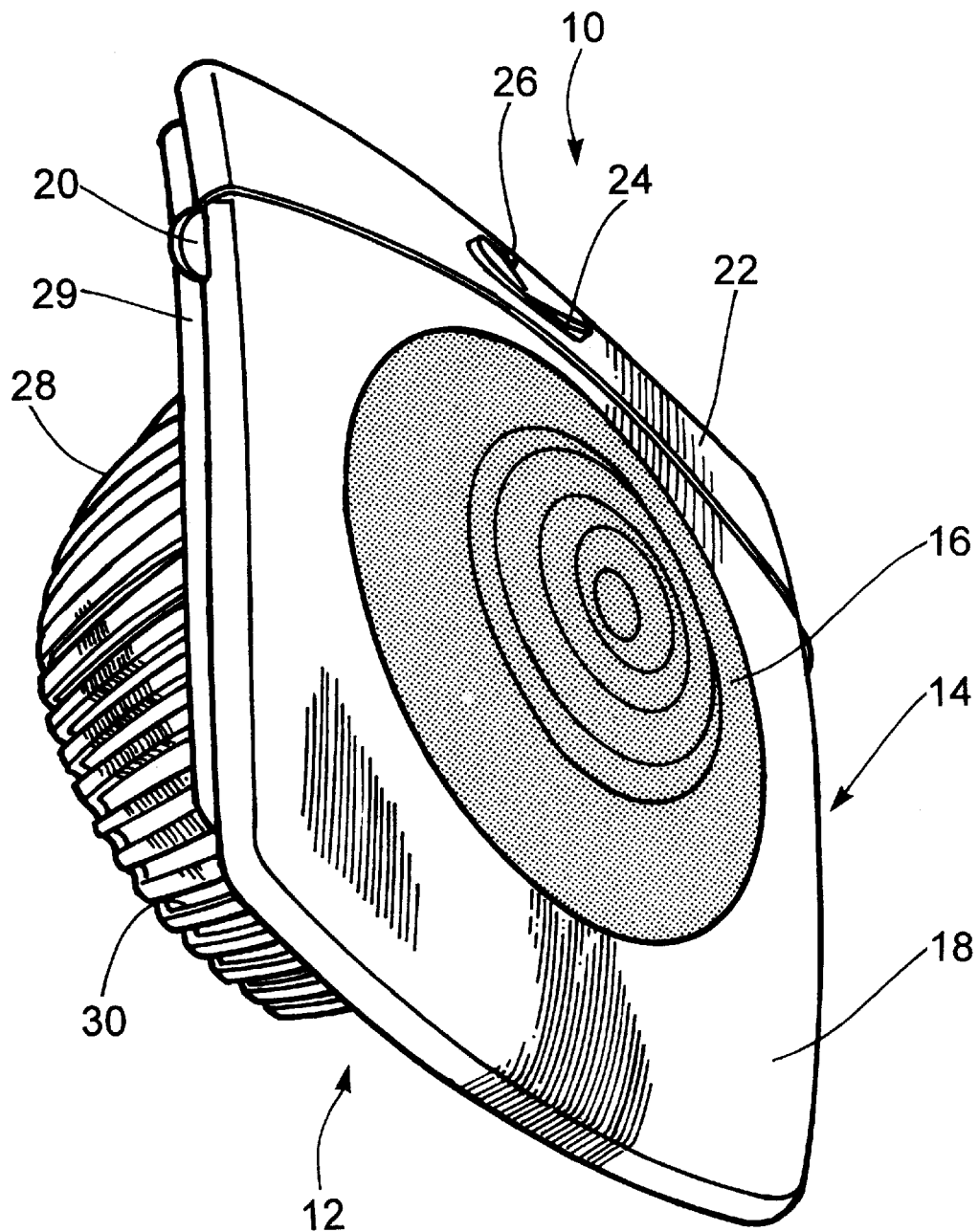
FIG. 1 is a perspective view of an air filtration device according to the preferred embodiment of the present invention.
Figure 2:
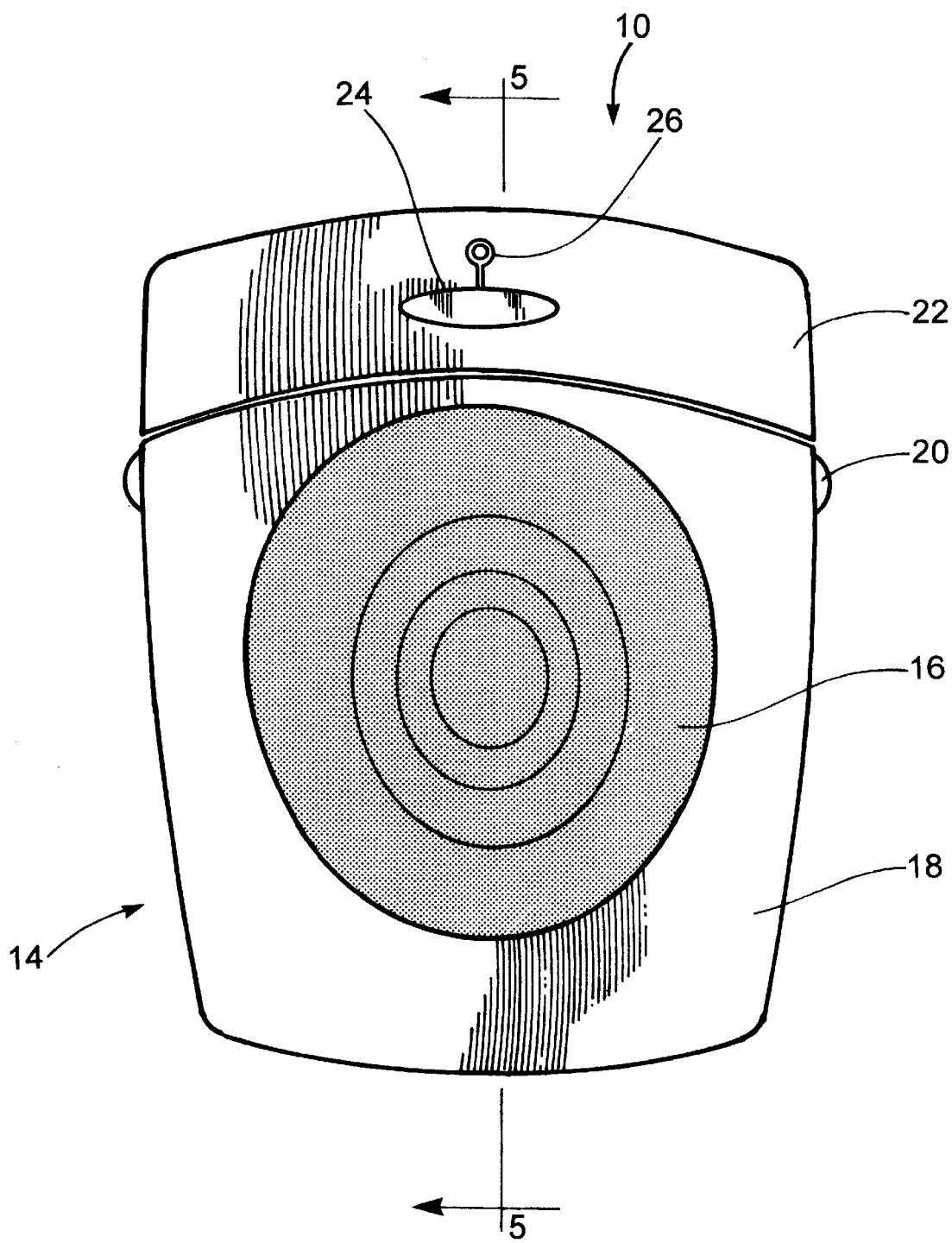
FIG. 2 is a front view of the air filtration device illustrated in FIG. 1.
Figure 3:
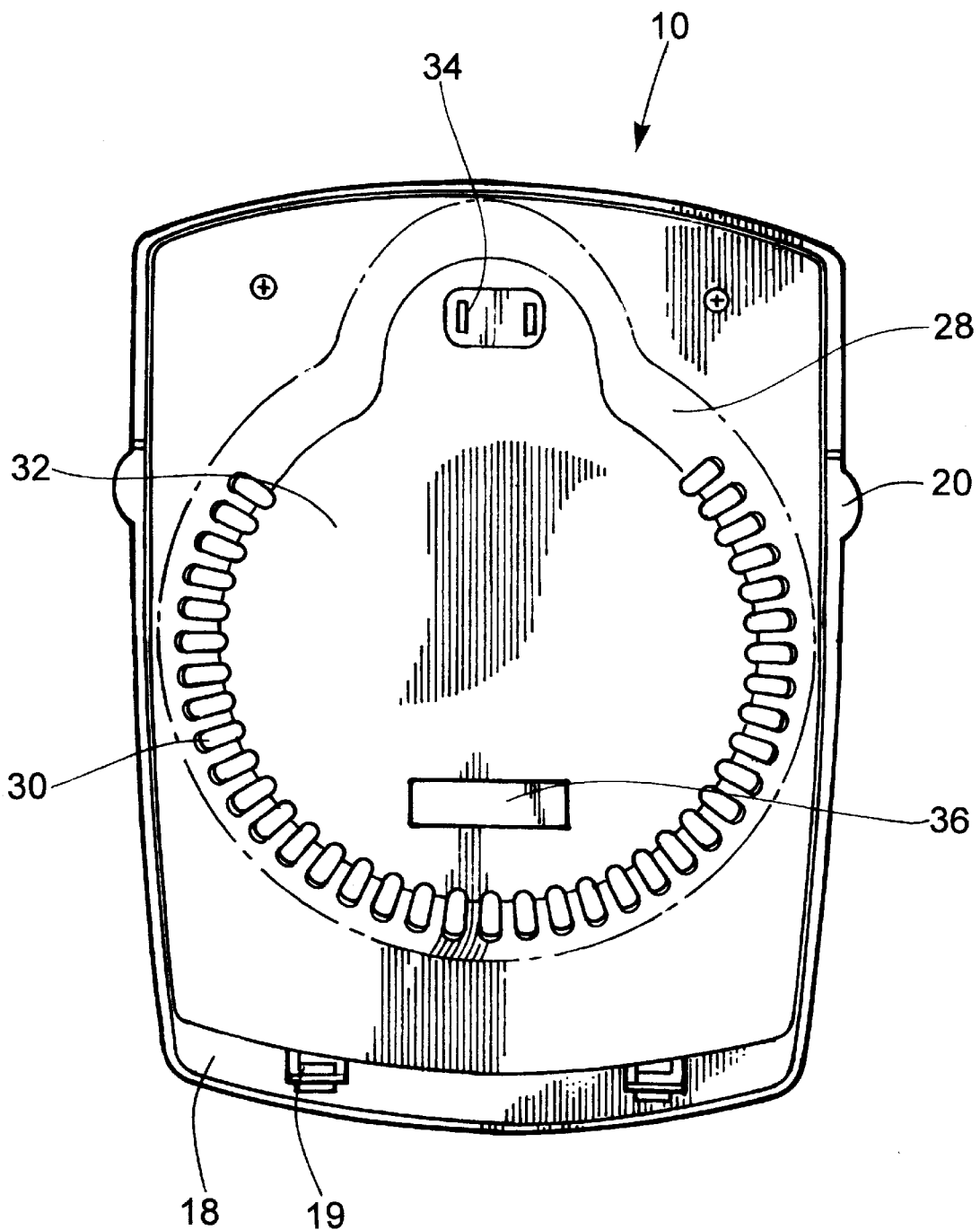
FIG. 3 is a rear view of the air filtration device illustrated in FIG. 1.

Turning now to the drawings and, more particularly to FIGS. 1, 2 and 3, an air filtration device for intake of atmospheric air, filtration of the atmospheric air and emission of filtered air is illustrated generally at 10 and includes a housing 12. The housing 12 includes a generally curved side wall 28 fixed to a generally flat front portion 29. A generally planar door 18 is fixed to the flat front portion 29, using hinges 19 as seen in FIG. 3. Referring back to FIG. 1, the door 18 includes a front surface 14 and a generally circular perforated air inlet grill 16. Tabs 20 are provided on each side of the door as seen in FIGS. 1 and 2, for ease of opening for filter replacement, as will be seen in greater detail hereinafter. The door covers approximately 80% of the front surface of the device 10. The remainder of the front surface is covered by a control panel 22. This ratio is primarily a function of aesthetics, and does not effect the performance of the device 10. A centralized rocker 24 is provided in the control panel 22 to control an internal switch to activate and deactivate the device 10 and an indicator light 26 is provided above the rocker switch 24 which illuminates when the device 10 is activated and, as will be seen in greater detail hereinafter, flashes when the filtration device 10 has been in operation for a predetermined time period. A plurality of vents 30 are provided around the curved side surface 28 to act as air outlets.

Turning now to FIG. 3, a rear surface 32 is provided adjacent and integral with the side surface 28. The rear surface 32 is curved to conform to the shape of the side surface 28.

In order to facilitate electrical power application, a pair of electrical prongs 34 extend outwardly from the rear surface 32 for operational engagement with a conventional electrical outlet. The electric prongs 34 are each formed of like dimensions, so that the air filtration device may be connected to an electrical outlet without regard to the dimensional differences between the socket openings. Accordingly, the device 10 may be oriented properly, with the prongs 34 above the vents 30, no matter what orientation a polarized socket is mounted to the outlet E. Further, the prong arrangement allows the device 10 to be mounted in the lower of the two sockets in an outlet pair, without regard to the dimensional differences between the socket openings. The location of the prongs 34 with respect to the top of the housing 12 ensures that the uppermost socket in a socket pair will remain available for use by other devices when the device 10 is in operation, as seen in FIG. 8.

Figure 7:
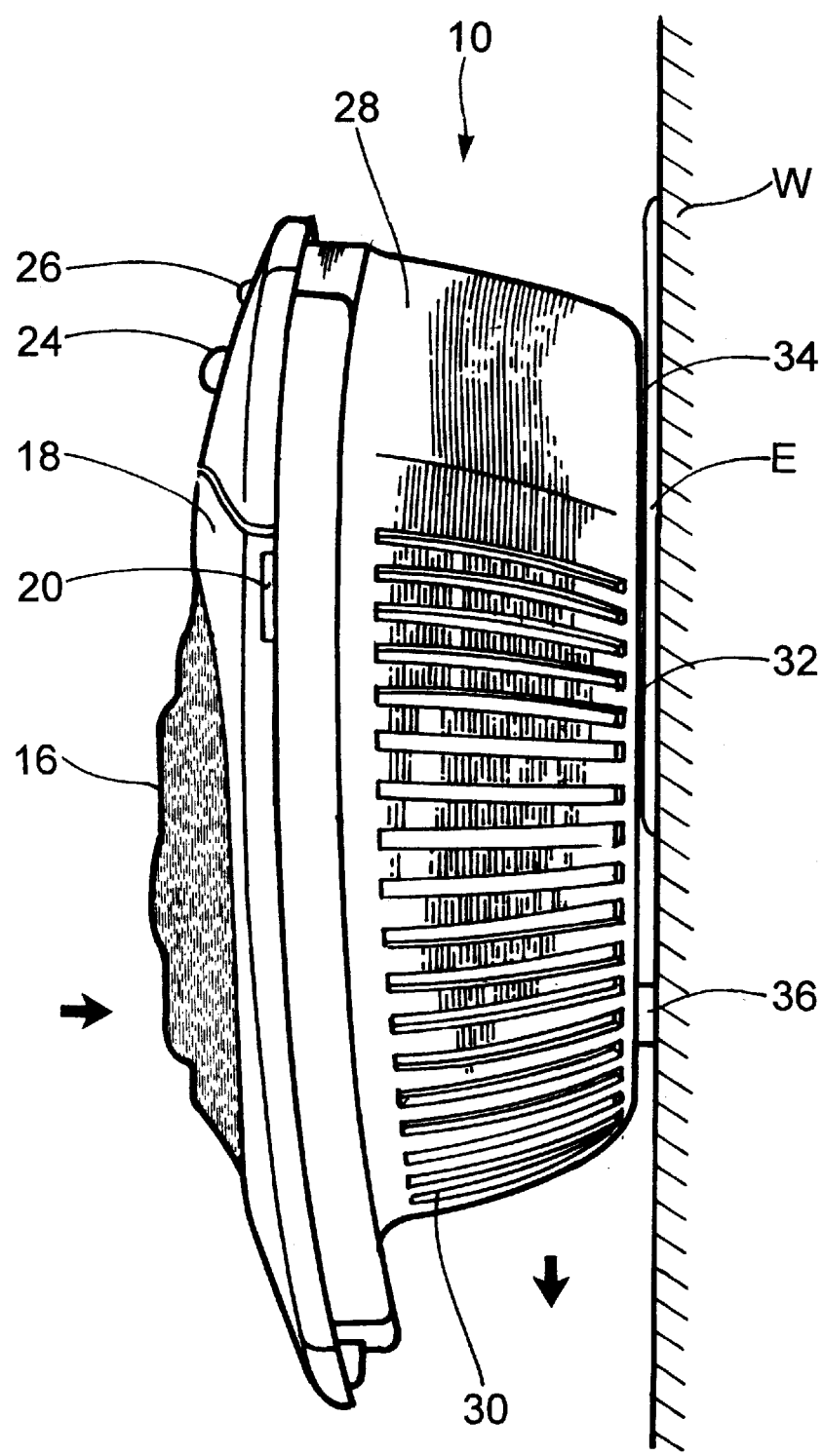
FIG. 7 is a side view of the air filtration device illustrated in FIG. 1, shown mounted to a wall.
Figure 8:
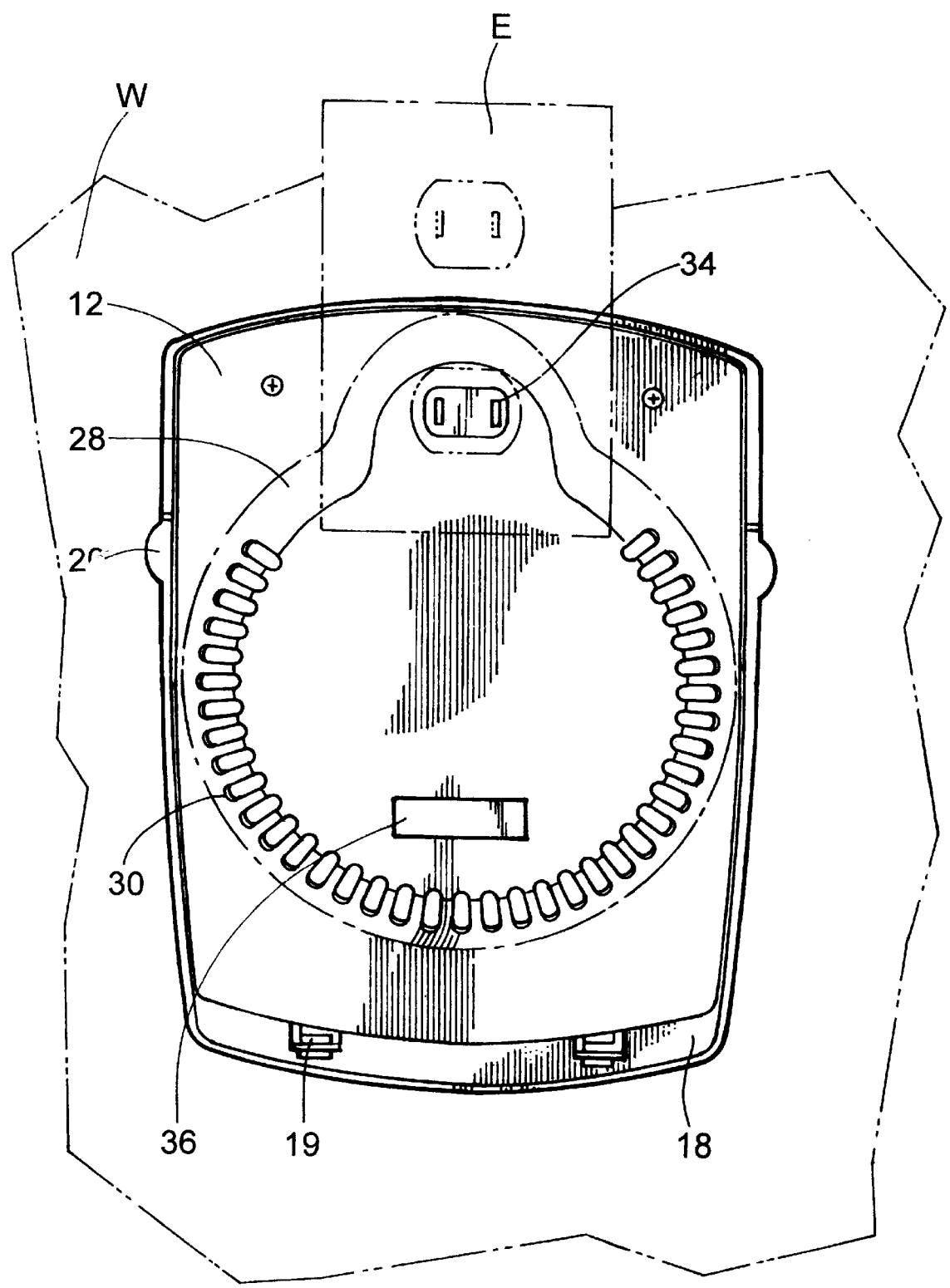
FIG. 8 is a rear view of the air filtration device as illustrated in FIG. 3, shown mounted to a wall.
Figure 9:
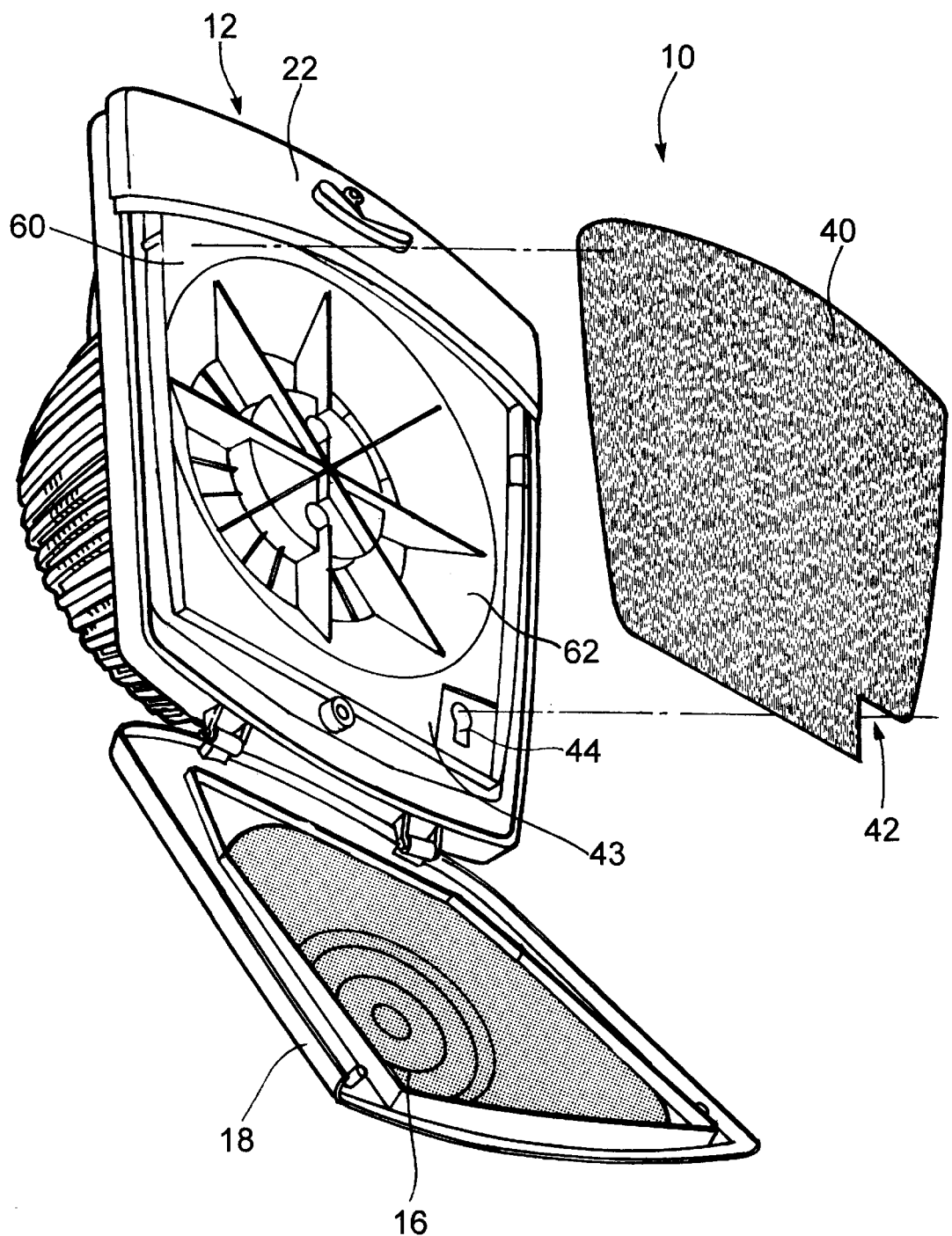
FIG. 9 is a front perspective view of the air filtration device illustrating filter placement.
Figure 10:
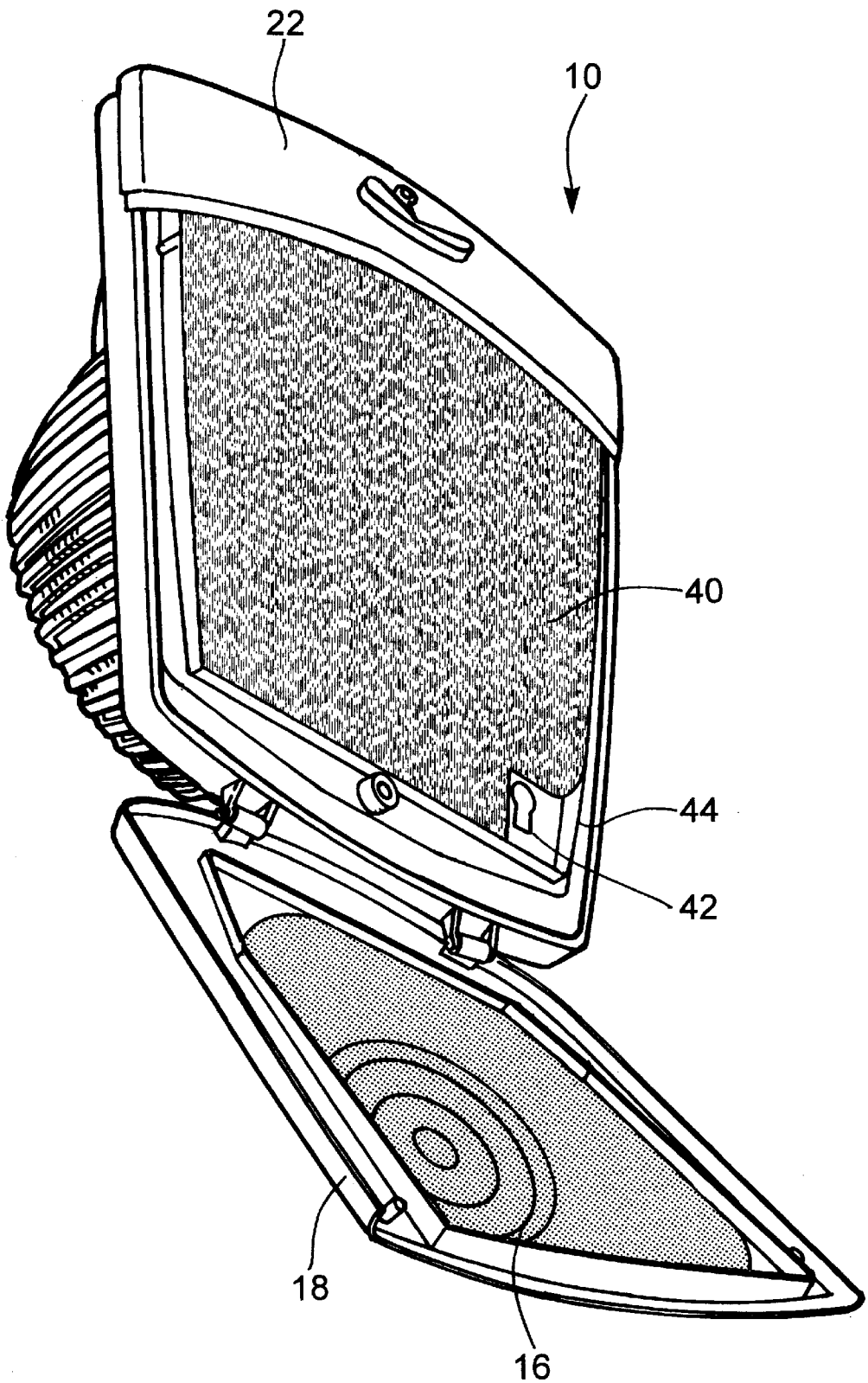
FIG. 10 is a front perspective view of the air filtration device illustrated in FIG. 9, with the filter inserted properly.

A bumper member 36 provided below the electrical prongs 34 for abutment with a vertical surface or wall W against which the device 10 is mounted, as seen in FIGS. 7 and 8. The bumper member 36 assists a user in orienting the device 10 with respect to a wall surface W. Further, the bumper member 36 may be formed from resilient material. A resilient bumper member 36 absorbs and dampens vibrations from the housing 12 to reduce or prevent their transmission to the wall W which reduces the noise associated with an operational air filtration device 10.

Figure 4:
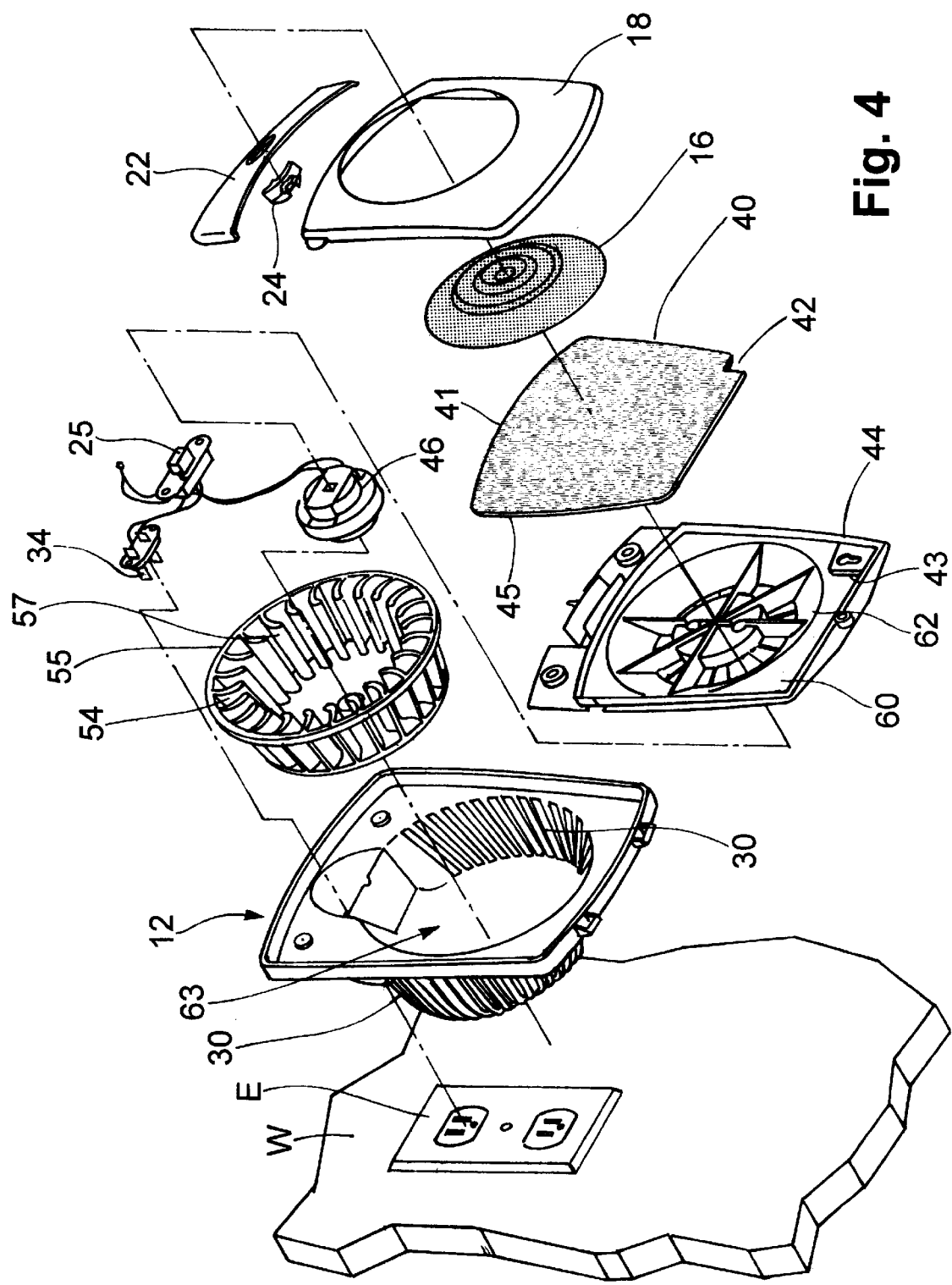
FIG. 4 is an exploded view of the air filtration device illustrated in FIG. 1.
Figure 5:
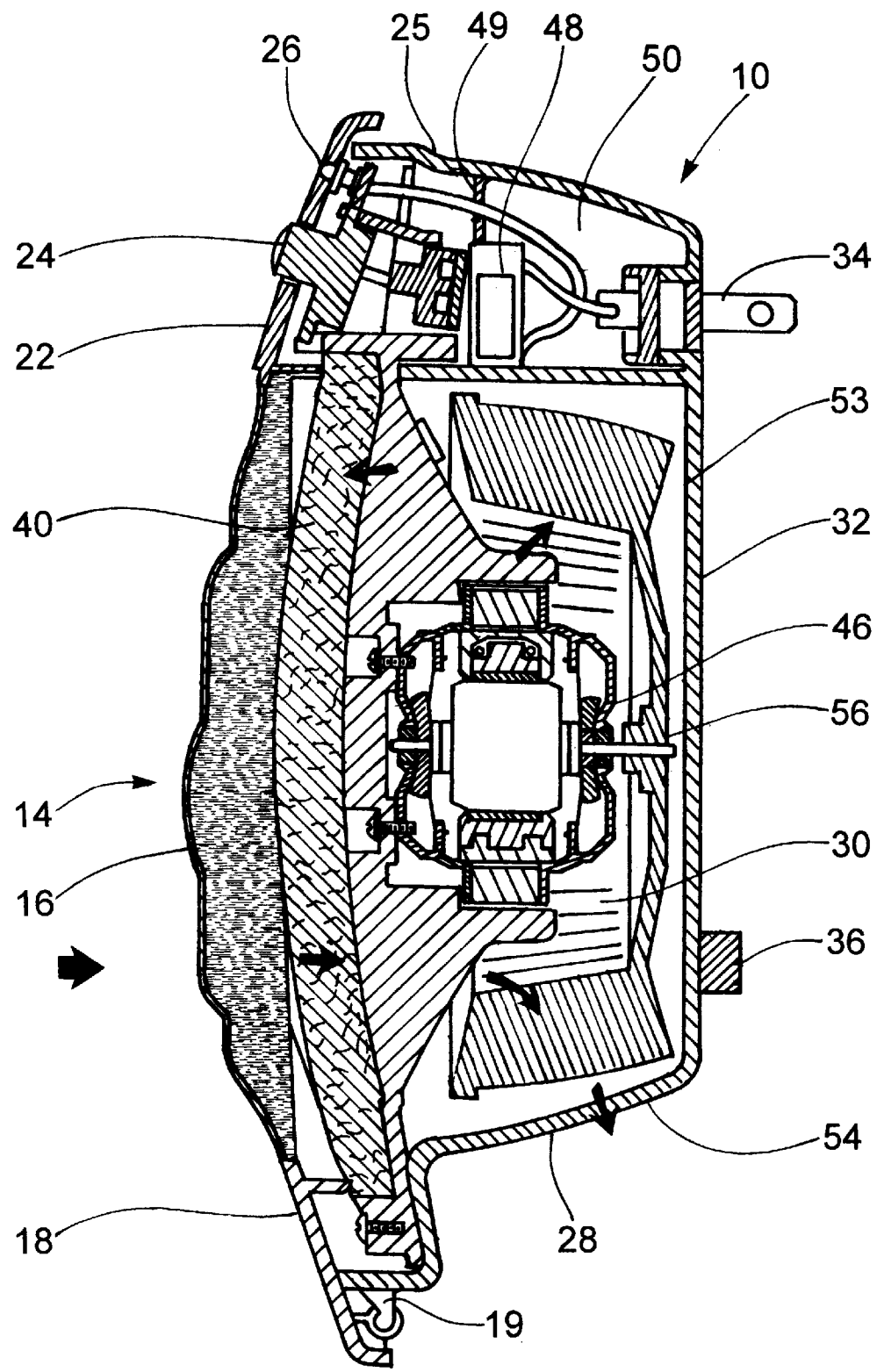
FIG. 5 is a side cutaway view of the air filtration device taken along line 5—5 in FIG. 2.
Figure 6:
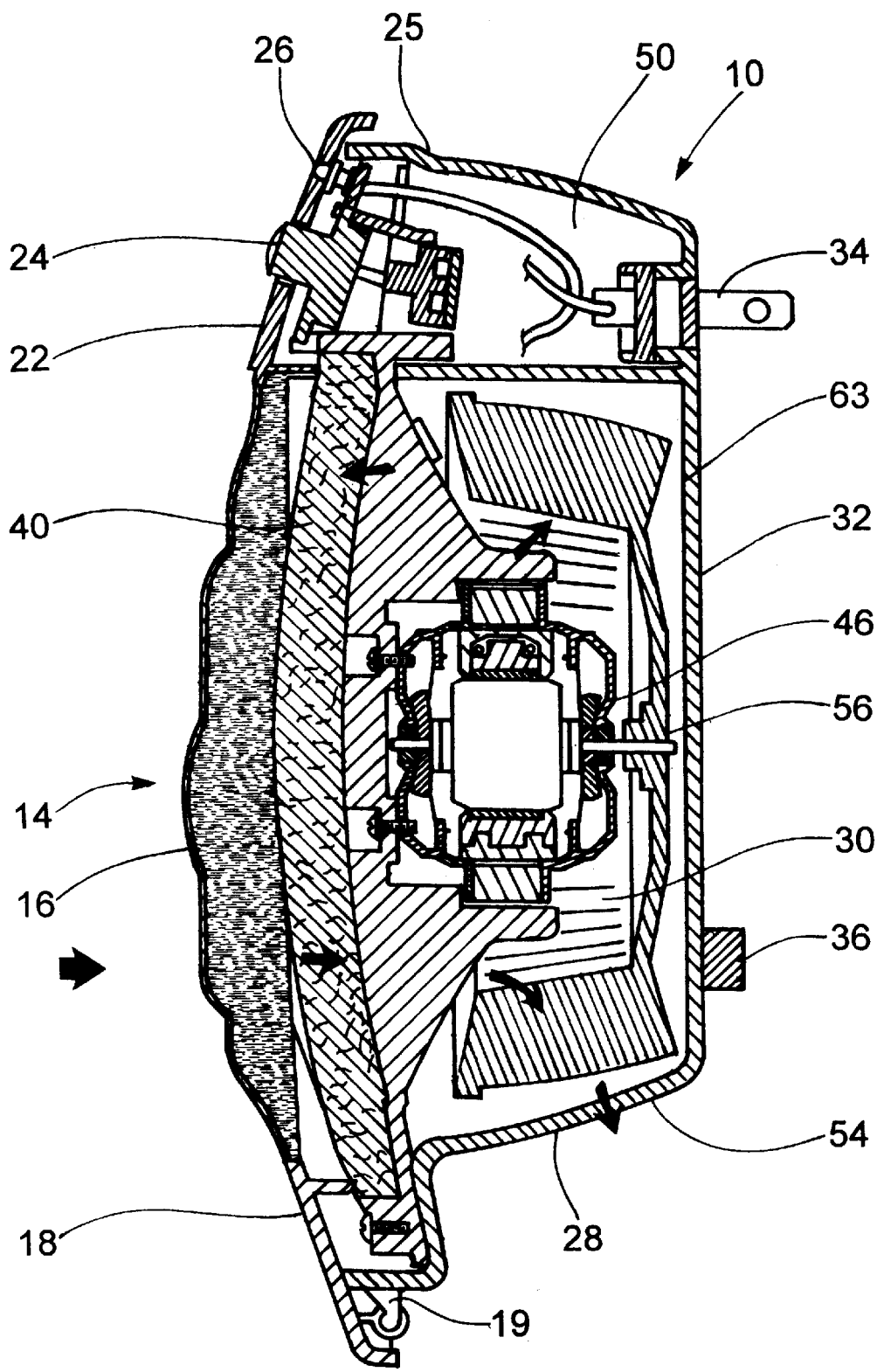
FIG. 6 is a side cutaway view of the air filtration device similar to the device in FIG. 5, illustrating an alternate embodiment without a timer circuit.

Turning now to FIGS. 4, 5 and 6, the internal components of the device 10 are illustrated. It will be appreciated that in order to filter air, an air flow path is defined through the housing 12, a filter 40 is provided and a device is provided to move the air. As seen in FIG. 5, the air flow path, illustrated by arrows, is defined by air movement generated within the device 10, from the air inlet 16, through the device 10 and outwardly through the vents 30. An impeller 54 is provided to move air through the device 10. The impeller 54 is a basket-like structure having two mounting rings 55 separated by a plurality of vanes 57 that are curved to draw air from outside the impeller 54 and drive the air outwardly through the side of the impeller 54.

The impeller 54 is rotated by an electric motor 46. As seen in FIG. 5, the motor 46 includes an armature 56 attached to the impeller 54. Electrical excitation of the motor 46 causes the armature 56 to rotate, thereby rotating the impeller 54.

As also seen in FIGS. 4, 5 and 6, a filter 40 is provided for filtering incoming air. The filter 40 can be directional in that a particular surface can be facing incoming air so that contaminated air is drawn through the filter 40 in a direction optimal for air filtration. One useful filter 40 includes a front filtration surface 41, a rear scrim 43 and is charcoal activated. It will be appreciated by those skilled in the filtration art that other filter compositions may be used. In particular, some filters may be configured to remove bathroom odors and some filters may be configured to remove kitchen odors. Other types of filters may include an increased charcoal content for smoke filtration. It is contemplated that various types of filters may be used with the present air filtration device 10 without reducing the effectiveness of any of the filters or the overall filtering efficacy of the device 10. The filter 40 is formed with a notch 42 in one corner, as will be explained in greater detail hereinafter.

An internal baffle plate 60 is provided to provide a surface for mounting the filter 40 and to direct air inwardly toward the impeller. A conical inner surface 62 is provided in the baffle plate 60 to provide a nozzle effect to increase the effectiveness of the filtration device 10. A locating surface 43 is formed as a raised rib in a lower corner of the baffle plate 60 corresponding to the notch 42 in the filter 40 for orienting the filter in the housing 12. An icon 44 is applied to the baffle plate 60 adjacent the locating surface 43, for visual indication of proper filter orientation. As also illustrated in FIG. 4, the air filtration device 10 is configured for mounting against an electrical outlet E mounted on a wall W.

As seen in FIGS. 5 and 6, the air flow path is defined through the housing 12 and illustrated by arrows. Atmospheric air enters the air filtration device 10 through the air inlet grill 16 and then travels through the filter 40 for contaminant removal. With reference to FIG. 4, the air travels down the conical inner surface 62 of the internal baffle plate 60 and enters a plenum 63 containing the rotating impeller 54. The impeller 54 draws the air along the flow path to an area within the rotating vanes 57 and the air is directed then outwardly through the rotating vanes 57 through the plenum 63 and eventually out through the vents 30 in the curved side wall 28.

Another feature of the present invention is the ability to determine in general when the filter 40 should be replaced. Under normal operation, the filter 40 should be replaced after a predetermined period of time. It may be presumed that the time period of filter contamination coincides with the operating period of the impeller 54 and therefore the motor 46. To that end, a timing circuit 48 is provided in the wiring 50 that connects the switch 25 to the motor 46. As also seen in FIGS. 5 and 6, the rocker 24 operates a remotely disposed switch 25, with the rocker 24 projecting through the control panel 22. It should be appreciated by those skilled in the art that such a timing circuit is a basic electronic device and can be configured in any number of ways. The timing circuit is also in electrical communication with the indicator lamp 26 which illuminates upon electrical excitation of the motor 46. When the timing circuit 48 has reached the end of a predetermined time period, the indicator light 26 is caused to pulsate, or flash, which is an indication that the filter 40 should likely be replaced. The timing circuit 48 also includes a reset switch 49 which allows an operator or owner to reset the timer once the filter is replaced. Optionally, the device 10 may be provided without a timing circuit 48 as illustrated in FIG. 6.

Referring now to FIGS. 7 and 8, in operation, the air filtration device 10 of the present invention is plugged into an electrical outlet using electrical prongs 34 in a generally conventional manner. The rear surface 32 of the housing 12 is closely adjacent to the electrical outlet E and may abut the electrical outlet E. The bumper member 36 abuts the wall W or outlet E or indeed, any vertical surface to which the device 10 may be fixed in order to provide proper orientation of the device 10 with respect to the wall surface W and, if the bumper member 36 is resilient, to provide a damping effect for motor vibrations that may be transmitted from the housing 12 during operation. Once a device 10 is against the wall W the rocker 24 is moved into an "on" position, which causes the switch 25 to provide electrical excitation to the motor 46 which, in turn, causes the impeller 54 to rotate, thereby drawing atmospheric air inwardly through the air inlet grill 16. The atmospheric air is drawn through the filter 40, and is caused to travel along the air flow path as defined in FIGS. 5 and 6. As the air passes through the filter 40 contaminants are removed and the filtered air travels intermediate the vanes 57 of the impeller 54 and is expelled through the vents 30 formed in the curved side surface 28. As seen in FIG. 7, and as will be appreciated by those skilled in the art, the filtered air is dispersed along an approximately 315° curve and the wall W acts as a baffle to enhance air dispersion from the device 10. Therefore, the air filtration device 10 of the present invention draws air from a generally focused source of contaminated air and provides a dispersed wave of filtered air to enhance the effectiveness of the filter operation. It should be noted that the relationship of the device 10 and the wall W, along with the vent location, is illustrated in FIG. 8.

As previously stated, the present invention provides a user with visual enhancements with respect to filter replacement. With reference to FIG. 9, a filter is shown spaced a distance from the baffle plate 60 to which it is to be mounted. As can be seen, the filter 40 includes a notch 42 formed in a lower right hand corner of the filter 40. The baffle plate 60 includes the icon 44 which is preferably shaped as a keyhole, yet may be shaped in any configuration imaginable. By orienting the notch 42 in abutment with the locating surface 43 and such that the icon 44 is visible through the notch 42 when the filter 40 is in place, as seen in FIG. 10, the filter 40 is oriented properly with respect to air flow. Should the filter 40 be inserted in a reverse manner, the icon 44 would not be visible, because the notch 42 would not be in a position to allow the user to see the icon 44. Additionally, the locating surface 43 acts to physically orient the filter 40. Therefore, the combination of the notch 42, the icon 44, and the locating surface 43 allows someone replacing the filter to easily determine when the filter is in proper orientation with respect to air flow.

By the above, the present invention provides a compact air filtration device that provides enhanced effectiveness, the ability to determine when a filter should be replaced, and a visual indication of proper filter orientation with respect to air flow.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An air filtration device for intake of atmospheric air, removal of contaminants from the atmospheric air, expulsion of filtered air and configured for operational association with a generally vertically oriented surface, said air filtration device comprising:

- a housing defining an air flow path therethrough and having a front surface, at least one side surface and a rear surface;
- at least one air inlet formed in said front surface of said housing;
- at least one air outlet formed in said housing intermediate said front surface and said rear surface, for cooperation of said air outlet with a generally vertical surface to which said air filtration device is associated for enhanced dispersion of filtered air expelled through said air outlet;
- a generally planar filter supported in said air flow path and being selectively removable from said housing, said filter including a notch formed therein for directing insertion of said filter in a correct orientation with respect to said air flow path; and an impeller for moving air through said housing along said air flow path from said at least one air inlet to said at least one air outlet, said impeller being supported within said housing.

2. An air filtration device according to claim 1 wherein said air outlet is formed on said at least one side surface and said air flow path is defined from said air inlet on said front surface through said filter, through said impeller and outwardly through said air outlet.

3. An air filtration device according to claim 1 and further comprising a bumper member attached to said rear surface of said housing for abutment with a generally vertical surface to which said air filtration device is associated.

4. An air filtration device according to claim 3 wherein said bumper member is formed from resilient material for enhanced noise reduction when said air filtration device is in operation.

5. An air filtration device according to claim 1 and further comprising a locating surface formed on said housing corresponding with said notch in said filter to orient said filter in said housing.

6. An air filtration device according to claim 1 wherein said housing includes an icon formed on said housing at a position corresponding with said notch formed in said filter when said filter is inserted in said housing for enhanced visual indication of proper filter orientation.

7. An air filtration device according to claim 1 wherein said air filtration device includes an electric motor for driving said impeller and a pair of electric prongs extending outwardly from said rear surface for operational engagement with an electrical wall outlet for supplying electric power to said electric motor.

8. An air filtration device according to claim 7 wherein said pair of electrical prongs are configured with each prong in said pair having substantially the same dimensions, so that said air filtration device may be connected to an electrical outlet without regard to the dimensional differences between the socket openings.

9. An air filtration device according to claim 1 and further comprising an indicator for providing an indication that said filter should be changed, said indicator providing information after a predetermined period of operation of said air filtration device has passed.

10. An air filtration device according to claim 9 wherein said impeller is driven electrically and said indicator includes an electric timer circuit operationally associated with said impeller for determining when a predetermined time of impeller operation has passed.

11. An air filtration device according to claim 10 and further comprising a lamp mounted to said housing for illumination when said impeller is in operation, said lamp being in electrical communication with said electric timer circuit and configured to provide pulsating illumination when a predetermined time of impeller operation has passed.

12. An air filtration device according to claim 11 and further comprising a reset switch in electrical communication with said electric timer circuit to selectively reset said electric timer circuit to a zero operational time setting.

13. An air filtration device for intake of atmospheric air, removal of contaminants from the atmospheric air, expulsion of filtered air, and configured for operational association with a generally vertically oriented surface, said air filtration device comprising:

a housing for abutting attachment to an electrical outlet, said housing defining an air flow path therethrough and having a front surface, at least one side surface and rear surface;

at least one air inlet formed in said housing;

at least one air outlet formed in said housing intermediate said front surface and said rear surface;

a generally planar filter supported in said air flow path and being selectively removable from said housing, said filter including a notch formed therein for directing insertion of said filter in a correct orientation with respect to said air flow path;

an electrically driven impeller for moving air through said housing along said air flow path from said at least one air inlet to said at least one air outlet, said impeller being supported within said housing;

a pair of electric prongs extending outwardly from said rear surface for operational engagement with an electrical wall outlet for supplying electric power to said impeller; and a bumper member attached to said rear surface of said housing for abutment with a generally vertical surface to which said resilient bumper member may abut for orienting said device with respect to said vertical surface.

14. An air filtration device according to claim 13 wherein said bumper member is formed from resilient material for enhanced noise reduction when said air filtration device is in operation.

15. An air filtration device according to claim 13 wherein said air inlet is formed on said front surface of said housing and said air flow path is defined from said air inlet on said front surface through said filter, through said impeller and outwardly through said air outlet.

16. An air filtration device according to claim 13 wherein said housing includes an icon formed at a position corresponding with said notch in said filter when said filter is inserted in said housing for enhanced visual indication of proper filter orientation.

17. An air filtration device according to claim 13 and further comprising a locating surface formed on said housing corresponding with said notch in said filter to orient said filter in said housing.

18. An air filtration device according to claim 13 wherein said pair of electrical prongs are configured with each prong in said pair having substantially the same dimensions, so that said air filtration device may be connected to an electrical outlet without regard to the dimensional differences between the socket openings.

19. An air filtration device according to claim 13 and further comprising an indicator for providing an indication that said filter should be changed, said indicator providing information after a predetermined period of operation of said air filtration device has passed.

20. An air filtration device according to claim 19 wherein said impeller is driven electrically and said indicator includes an electric timer circuit operationally engaged with said impeller for determining when a predetermined time of impeller operation has passed.

21. An air filtration device according to claim 20 and further comprising a lamp mounted to said housing for illumination when said impeller is in operation, said lamp being in electrical communication with said electric timer circuit and configured to provide pulsating illumination when a predetermined time of impeller operation has passed.

22. An air filtration device according to claim 21 and further comprising a reset switch in electrical communication with said electric timer circuit to selectively reset said electric timer circuit to a zero operational time setting.

23. An air filtration device for intake of atmospheric air, removal of contaminants from the atmospheric air, expulsion of filtered air, and configured for operational association with a generally vertically oriented surface, said air filtration device comprising:

a housing for abutting attachment to an electrical outlet, said housing defining an air flow path therethrough and having a front surface, a curved side surface and a rear surface;

at least one air inlet formed in said front surface of said housing;

a series of vents forming an air outlet formed in said side surface, for cooperation with a generally vertical surface to which said air filtration device is associated for enhanced dispersion of filtered air expelled through said vents;

a filter supported within said housing intermediate said at least one air inlet and said vents, said filter being formed as a generally planar member selectively removable from said housing and including a notch formed therein for directing insertion of said filter in a correct orientation with respect to said air flow path;

an electrically driven impeller for moving air through said housing along said air flow path from said at least one air inlet to said vents, said impeller being rotatably supported within said housing;

a pair of electric prongs extending outwardly from said rear surface for operational engagement with an electrical wall outlet for supplying electric power to said impeller; and a bumper member attached to said rear surface of said housing for abutment with a generally vertical surface to which said bumper member may abut for orienting said device with respect to said vertical surface.

24. An air filtration device according to claim 23 wherein said bumper member is formed from resilient material for enhanced noise reduction when said air filtration device is in operation.

25. An air filtration device according to claim 23 and further comprising a locating surface formed on said housing corresponding with said notch in said filter to orient said filter in said housing.

26. An air filtration device according to claim 23 wherein said pair of electrical prongs are configured with each prong in said pair having substantially the same dimensions, so that said air filtration device may be connected to an electrical outlet without regard to the dimensional differences between the socket openings.

27. An air filtration device according to claim 23 and further comprising an indicator for providing an indication that said filter should be changed, said indicator including an electric timer circuit operationally engaged with said impeller for determining when a predetermined time of impeller operation has passed.

28. An air filtration device according to claim 27 and further comprising a lamp mounted to said housing for illumination when said impeller is in operation, said lamp being in electrical communication with said electric timer circuit and configured to provide pulsating illumination when a predetermined time of impeller operation has passed.

29. An air filtration device according to claim 27 and further comprising a reset switch in electrical communication with said electric timer circuit to selectively reset said electric timer circuit to a zero operational time setting.

30. An air filtration device for intake of atmospheric air, removal of contaminants from the atmospheric air and expulsion of filtered air, said air filtration device comprising:
- a housing defining an air flow path therethrough and including a movable door, which is supported by at least one hinge;
- an air inlet formed in said housing;
- an air outlet formed in said housing in spaced relation to said air inlet, at least one of said air inlet and said air outlet formed in said door;
- a filter located in said air flow path;
- an impeller for moving air through said housing along said air flow path from said air inlet to said air outlet;
- a motor for driving said impeller; and
- a pair of electric prongs extending outwardly from said housing for operational engagement with an electrical wall outlet for supplying electric power to said motor.

31. An air filtration device for intake of atmospheric air, removal of contaminants from the atmospheric air and expulsion of filtered air, said air filtration device comprising:
- a housing defining an air flow path therethrough and including a movable door;
- an air inlet formed in said housing;
- an air outlet formed in said housing in spaced relation to said air inlet, at least one of said air inlet and air outlet formed in said door;
- a filter located in said air flow path;
- a baffle plate supported intermediate said air inlet and said air outlet, wherein said filter is located intermediate said baffle plate and said door to filter air entering through said at least one air inlet;
- an impeller for moving air through said housing along said air flow path from said air inlet to said air outlet;
- a motor for driving said impeller; and
- a pair of electric prongs extending outwardly from said housing for operational engagement with an electrical wall outlet for supplying electric power to said motor.

32. An air filtration device according to claim 30 further comprising an inlet grill supported by said door.

33. An air filtration device for intake of atmospheric air, removal of contaminants from the atmospheric air and expulsion of filtered air, said air filtration device comprising:
- a housing defining an air flow path therethrough and having a front surface, at least one side surface and a rear surface;
- at least one air inlet formed in said housing;
- at least one air outlet formed in said housing in spaced relation to said air inlet;
- an impeller for moving air through said housing along said air flow path from said at least one air inlet to said at least one air outlet, said impeller including a plurality of vanes defining a basket-like structure supported for rotation around a central inside area, and said vanes draw air into said central inside area and expel the air radially outwardly from said basket-like structure;
- a substantially planar filter located in said air flow path intermediate said at least one air inlet and said impeller;
- a motor for driving said impeller; and
- a pair of electric prongs extending outwardly from said rear surface for operational engagement with an electrical wall outlet for supplying electric power to said motor.

34. An air filtration device for intake of atmospheric air, removal of contaminants from the atmospheric air and expulsion of filtered air, said air filtration device comprising:
- a housing defining an air flow path therethrough and having a front surface, at least one side surface and a rear surface;
- at least one air inlet formed in said housing;
- at least one air outlet formed in said housing in spaced relation to said air inlet;
- a baffle plate positioned intermediate said at least one air inlet and said at least one air outlet;
- an impeller for moving air through said housing along said air flow path from said at least one said inlet to said at least one air outlet;
- a substantially planar filter located in said air flow path intermediate said at least one air inlet and said impeller;
- a motor for driving said impeller; and
- a pair of electric prongs extending outwardly from said rear surface for operational engagement with an electrical wall outlet for supplying electric power to said motor.

35. An air filtration device according to claim 34 wherein said impeller is rotatably supported by said baffle plate.

36. An air filtration device for intake of atmospheric air, removal of contaminants from the atmospheric air, expulsion of filtered air and configured for operational association with a generally vertically oriented surface, said air filtration device comprising:
- a housing defining an air flow path therethrough and having a front surface, at least one curved side surface and a rear surface;
- at least one air inlet formed in said front surface of said housing;
- at least one air outlet formed as a series of vents along said curvature of said side surface intermediate said front surface and said rear surface for cooperation of said air outlet with a generally vertical surface to which said air filtration device is associated for enhanced dispersion of filtered air expelled through said air outlet;
- a filter supported in said air flow path; and
- an impeller for moving air through said housing along said air flow path from said at least one air inlet to said at least one air outlet, said impeller being supported within said housing, said air outlet being formed on said at least one side surface and said air flow path being defined from said air inlet on said front surface through said filter, through said impeller and outwardly through said air outlet, said air outlet being formed as a series of vents along said curvature of said side surface.

* * * * *